United States Patent [19]
Snyder

[11] Patent Number: 6,026,876
[45] Date of Patent: Feb. 22, 2000

[54] TIRE TRACTION ENHANCEMENT SYSTEM

[76] Inventor: Frank L. Snyder, 7400 Willow Creek Dr., #18, Citrus Heights, Calif. 95610

[21] Appl. No.: 09/047,957

[22] Filed: Mar. 25, 1998

[51] Int. Cl.[7] ..................................................... B60C 27/00
[52] U.S. Cl. ........................... 152/218; 152/219; 152/233
[58] Field of Search ............................... 152/213 A, 218, 152/219, 231, 232, 233, 217

[56] References Cited

U.S. PATENT DOCUMENTS

| | | |
|---|---|---|
| 953,645 | 3/1910 | Story et al. . |
| 1,103,064 | 7/1914 | Lashar .................................. 152/213 A |
| 1,391,261 | 9/1921 | McComb et al. . |
| 2,207,971 | 7/1940 | Chaussee . |
| 2,275,994 | 3/1942 | Ruhkala . |
| 4,185,674 | 1/1980 | Giannone . |
| 5,082,039 | 1/1992 | Franklin . |

Primary Examiner—Russell D. Stormer
Attorney, Agent, or Firm—Heisler & Associates

[57] ABSTRACT

A tire traction enhancement system 10 is provided comprising tire chains 2 which include an outboard circumferential elongate element 4 and an inboard circumferential elongate element 6 between which are attached a plurality of transverse traction members 8. Ends 5, 7 of the elements 4, 6 are releasably attached via an outboard connection subsystem 29 and an inboard connection subsystem 20, respectively. The outboard connection subsystem 29 includes a first cable guide 30 attached to a first end 5 of the outboard element 4 and second cable guide 80 attached to a second end 5 of the outboard element 4. A cable 50 extends from the first end 5, around the second cable guide 80 and then around the first cable guide 30 before the cable 50 extends to attach to a mid-portion of the outboard element 4. The cable 50 routing configuration amplifies closure force A which draws the ends 5 of the outboard circumferential element 4 together. A tensioner 60 including an elastic cord 66 is interposed on the cable 50 to provide continual tension on the system 10 to keep the transverse traction members 8 drawn tightly against the tire tread I.

20 Claims, 3 Drawing Sheets

TIRE TRACTION ENHANCEMENT SYSTEM

FIELD OF THE INVENTION

The present invention relates to systems which enhance the traction of tires on a vehicle wheel assembly. More particularly, this invention relates to systems for installing, connecting, tightening and removing a variety of different vehicle tire coverings, particularly those commonly known as tire chains, which require minimal physical strength, allow installation without the need for lifting or jacking the vehicle tires off the ground, do not require that the vehicle be moved during the installation process and provide a means for continual take-up of any slack in the tire covering.

BACKGROUND OF THE INVENTION

Tire traction enhancement systems, including those commonly known as tire chains, are used to provide increased vehicle traction during inclement weather, particularly where road conditions include snow and ice. When road conditions worsen to the point that additional tire traction is required to allow a vehicle to continue to safely travel, installation conditions are also typically at their worst. Consequently, one's ability to easily and simply install a tire traction enhancement system becomes extremely important. In addition, to maximize utility of any tire traction enhancement system, it is critical that any vehicle operator whether male or female, young or old, be able to actually install the system, regardless of each individual's level of physical strength.

The configurations of most tire traction enhancement systems currently in use, when outstretched flat on the ground, are ladder-like, incorporating two parallel elongate elements connected by a plurality of transverse traction members. The length of each elongate element is typically the same or slightly less than the tire circumference. The length of each traction member is typically slightly longer than the tire tread width.

The elongate elements and traction members are typically made of flexible material which may include chain, cable, high strength hydrocarbon polymer straps or other similar material. The elongate elements are located on an inboard and an outboard side of the vehicle wheel and serve to draw the traction members tightly against the tire tread.

To install a typical system, two methods are typically used. In one, the entire chain and connector assembly is first draped over the top of the tire. The vehicle is then jacked up until the tire is sufficiently raised to allow the assembly to be wrapped underneath. A connector is then provided to attach ends of the elongate elements together. Alternatively, the assembly is laid flat on the ground in front of or behind the tire and the vehicle rolled slowly over the assembly until both ends of both elongate elements are free and can be connected over a top of the tire. Some systems are configured with continuous elongate elements and no ends (such as Ruhkala, U.S. Pat. No. 2,275,994). Such systems require that the car be jacked up first and then the chains installed from an outboard side of the wheel.

Once the chain assembly has been manipulated to be adjacent the tire and provide access to the ends, the ends are connected to completely encircle the tire. Then, various tightening devices are used to draw the transverse traction members tightly against the tread of the tire. If the transverse traction members are not pulled tightly against the tire tread, the assembly will slip and traction will be lost. In addition, during actual vehicle operation, if slack is still present in the assembly, the traction members will be pulled away from the tire due to rotational centrifugal force. Depending on the amount of slack present, the assembly may damage the vehicle or the assembly itself may be damaged. Hence, it is critical that any tire traction enhancement system be installed tightly at the outset, and, that the tightness be retained while driving.

Current systems typically require a driver to periodically stop his or her vehicle to tighten the assembly to remove any slack which may have developed. In many circumstances, the driver becomes aware that the chain assembly must be tightened by the noise generated when the loose chains slap against the fender well of the car. Unfortunately, damage may have already been caused to the vehicle or the chain assembly. Hence, it is preferable that a system continually remove any slack introduced into the chains during operation to ensure that such damage does not occur.

In most circumstances, vehicle operators will likely find themselves installing a tire chain assembly close to a busy roadside in extremely adverse and dangerous conditions which may include extreme cold, wet, snowy or icy environments. As a result, simplicity and speed of installation is critical. If one's hands are cold or have become numb, installation of a typical traction enhancement system becomes very difficult.

The patent to Ruhkala, identified above, includes a tightening mechanism consisting of a tensioner cable routed through multiple pulleys then attached to a spring. This complex configuration attempts to dynamically increase tension on both inboard and outboard parallel circumferential elongate elements simultaneously. Force is distributed to both sides of the assembly by running a tensioner cable from the outboard pulley system across the tire tread, through another pulley and to other connection points on the inboard circumferential parallel member. The tensioner cable finally terminates by connecting to a metal spring which is attached to the inboard circumferential elongate element. This cable routing increases the difficulty and complexity of installation and subjects the critical tensioner cable to undue wear caused by continual exposure between the tire tread and road surface.

Additionally, because Ruhkala teaches continuous circumferential elements this configuration either requires that the vehicle be jacked up to allow tire chain installation or an awkward process of driving onto the continuous elements of the chains must be performed. Jacking a vehicle off the ground on a roadside in wet, icy conditions where adequate footing may be unavailable creates a very dangerous situation for the party installing the chains. In particular, it is typically necessary to lay flat on the ground and reach behind the tire to make an inboard connection. If the jack happened to slip, the installer could be severely injured, crushed or even killed by the descent of the vehicle on their body. Further, the tensioner spring has a limited range of motion which may be insufficient to remove all slack from the system during operation.

The tensioner system of the present invention is totally contained on the outboard side of the wheel assembly. Hence, the tensioner cable is not subjected to any road wear and installation is simplified. Further, because non-continuous circumferential element chains are used, the vehicle does not need to be jacked up to allow for installation, consequently, the installer's safety is greatly increased. Additionally, the present invention does not require the vehicle to be moved partway through installation to either access connectors or to adjust chain placement on the tire.

Other relevant prior art lacks any means by which the strength of the individual installer can be amplified through mechanical advantage to ease installation while concurrently providing a greater amount of tensioning once installed. In addition, the other relevant prior art does not provide a quick and simple installation system but rather requires various different complex attachment procedures. Finally, the other prior art does not contemplate any means for continuously removing slack which develops during the normal course of operation of a vehicle with tire chains installed.

Accordingly, a need exists for a simple, effective tire traction enhancement system that will operate safely, can be easily installed by individuals with minimal physical strength, will continually seek to self-center the assembly, uniformly distribute assembly weight and continually maintain tension in the tightening mechanism to tightly draw the transverse traction members against the tire tread, even while operating the vehicle.

SUMMARY OF THE INVENTION

The present invention is an attachment system for tire chains. The tire chains typically include an outboard circumferential element and an inboard circumferential element with transverse traction members extending between the two circumferential elements. The attachment system includes both an inboard and an outboard connection subsystem. These two subsystems draw the ends of the circumferential elements of the chains tightly together to snugly and securely encircle the tire. The inboard connection subsystem is typically of fixed length and uses a simple clip and ring to connect the inboard ends of the tire chains while draped over a tire. The outboard connection subsystem is configured to pull the outboard ends of the circumferential elements of the chains closer together as any slack develops, even during actual operation. A tensioner is included in the outboard connection subsystem to continually apply a closure force to the ends of the outboard circumferential elements of the tire chains. The applied closure force is amplified by a cable and guide configuration which creates a mechanical advantage similar to that provided by a block and tackle pulley system.

Hence, the present invention provides a tire traction enhancement system which allows an individual, regardless of physical strength, to easily, simply, safely, securely and quickly install, operate and remove a set of tire chains on the tires of their vehicle, regardless of adverse weather conditions. First, the present invention eliminates the need for one to jack a vehicle off the ground to install the tire chains, thereby dramatically increasing the overall safety of the installation process and reducing the individual strength required for installation. Next, the present invention includes a cable and cable guide arrangement which doubles the force applied by the individual installing the chains to maximize the closure force applied to the tire chains to ensure the entire system is snugly fitted to the vehicle's tires.

Further, the present invention presents the primary component of the attachment system, the outboard connection subsystem, on the outboard side of the tire, allowing easy access to the tensioning mechanism during installation and removal. The present invention provides cable guides whose configuration allows a securely installed tire chain to be quickly removed by reversing the installation procedure to allow the tensioner cable to be slipped over the curved ends of the cable guide guards, thereby eliminating the need to wrestle to disconnect a metal hook under tension and sandwiched between a taught wire chord of the outboard element and the rubber of the tire sidewall. Further, the present invention provides a continually self-adjusting attachment system that removes initial slack from the system at installation and continues to remove slack from the system during operation, ensuring that the tire chains remain pulled snugly against the tire tread at all times. The same self-adjusting attachment system also serves to self-center the tire chains on the tire and to reasonably uniformly distribute the weight around the tire, thereby improving spinning balance which allows the vehicle to be operated at higher speeds than previous systems due to a reduction in vibration caused by an imbalanced system. Additionally, the cable of the tensioning mechanism lays across the center of the wheel which serves to dynamically balance the attachment system, further reducing vibration when operated at higher speeds.

To install the tire chains and attachment system, one first drapes the chains over the vehicle's tire, with the outboard circumferential elements and the outboard connection subsystem placed on the outboard side of the tire. Then, one reaches behind the tire to connect the inboard ends of the tire chains together using the inboard connection subsystem such as the clip and ring. After completing the inboard connection, one pulls the ends of the outboard chains as close together as possible. Then, the cable of the tensioning mechanism, which is attached to a first cable guide, is wrapped around the second cable guide to which it is not attached, then back around the first cable guide. Next, the installer stretches the tensioner on the cable toward the other side of the tire away from the cable guides, connecting a hook attached to the end of the tensioner to the approximate midpoint of the outboard circumferential element of the chains. Then, one would recheck the inboard chains to make sure they are reasonably evenly situated about the wheel rim. Then, one would simply drive the vehicle slowly forward for a short distance to allow the tensioner to take up any initial slack which is released at the outset of driving. This will snug up and center the chains on the tire. As the vehicle continues to be driven, any additional slack which develops in the system will be taken up by the tensioner, thereby ensuring that the chains remain snugly secured to the tire throughout operation.

To remove the chains and attachment system, one first disconnects the hook on the end of the tensioner from the outboard element. Alternatively, if the hook is difficult to disengage, one may first pull the elastic cord of the tensioner toward the cable guides to provide sufficient slack in the cable to slip it off the first cable guide. This should provide sufficient slack to disengage the hook from the outboard element. Since the hood and tensioner have been released, the inboard element will have sufficient slack to allow the inboard connection subsystem to be released. This is accomplished by simply disconnecting the clip from the ring.

Finally, the chains and attachment system can be simply dragged off the tire to the ground. As with the installation of the tire chains and attachment system, the vehicle need not be moved during the removal process.

OBJECTS OF THE INVENTION

Accordingly, a primary object of the present invention is to provide a tire traction enhancement system that can be easily installed without jacking the vehicle's wheel assembly off the ground and which does not require tightening after installation.

Another object of the present invention is to provide a tire traction enhancement system that can be installed without moving the vehicle at anytime during the installation process.

Another object of the present invention is to provide a tire traction enhancement system that requires a minimum of individual physical strength for installation.

Another object of the present invention is to provide a tire traction enhancement system that requires a minimum of physical strength for removal.

Another object of the present invention is to provide a tire traction enhancement system whose installation tension can be easily removed to facilitate ease and speed of removal.

Another object of the present invention is to provide a tire traction enhancement system that can be easily understood and hence, can be installed quickly.

Another object of the present invention is to provide a tire traction enhancement system that automatically adjusts to increase closure force to offset increased centrifugal force created by rotational speed of the tire while driving the vehicle.

Another object of the present invention is to provide a tire traction enhancement system that automatically centers the tire chains on the tire and wheel assembly during operation.

Another object of the present invention is to provide a tire traction enhancement system that automatically uniformly distributes the tire chain assembly weight around the wheel assembly to improve the balance and smooth operation to minimize vibration at higher vehicle operational speeds.

Another object of the present invention is to provide a tire traction enhancement system whose primary tensioning system is located on the outboard side of the wheel assembly and is thereby immediately accessible.

Another object of the present invention is to provide a tire traction enhancement system whose maximum tensioning and closure force can be incrementally increased to accommodate higher vehicle operational speeds without increasing the individual physical strength required for installation.

Another object of this invention is to provide a tire traction enhancement system of simple and reliable manufacture from commonly available materials.

Other further objects of the present invention will become apparent from a careful reading of the included drawing figures, the claims and detailed description of the invention.

DESCRIPTION OF THE PREFERRED EMBODIMENT

Figure 1:
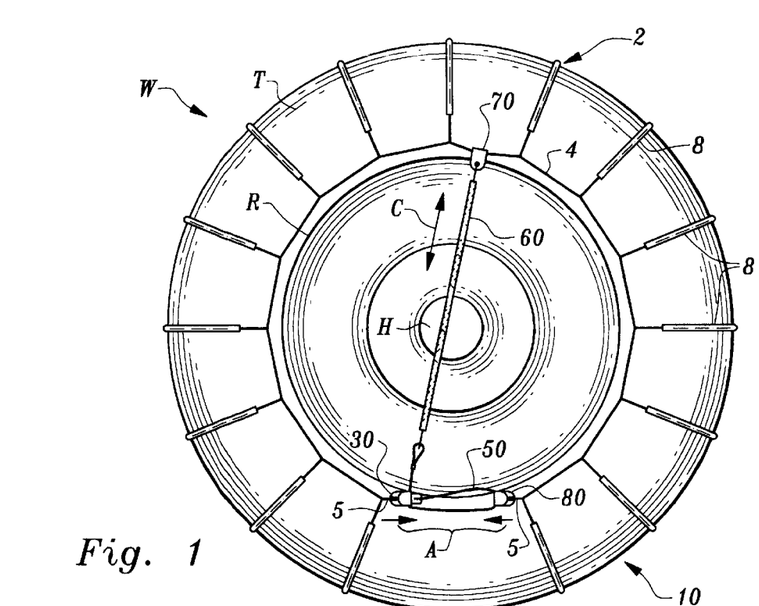
FIG. 1 is a side elevation view from an outboard perspective of a wheel assembly with the tire traction enhancement system of this invention installed on the wheel.
Figure 2:
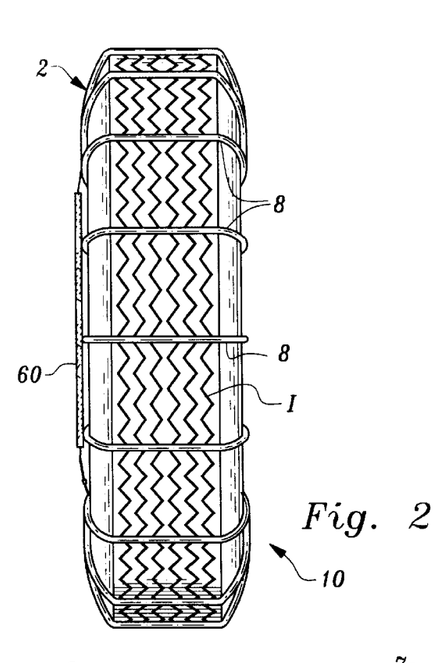
FIG. 2 is a front elevation view of that which is shown in FIG. 1.
Figure 3:
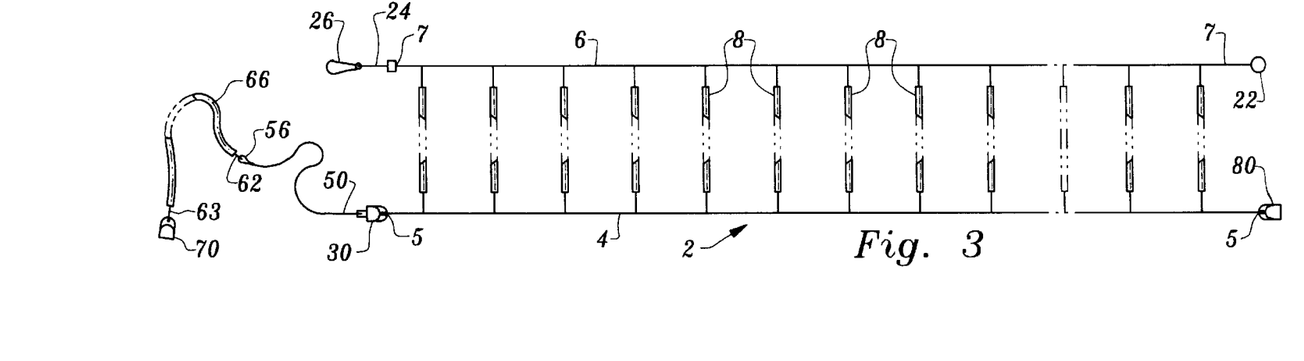
FIG. 3 is a top plan view of the tire chain assembly of this invention laid out flat on the ground.

Referring to the drawings, wherein like reference numerals represent like parts throughout the various drawing figures, reference numeral 10 is directed to a tire traction enhancement system. The system 10 provides for attachment of tire chains 2, cables and the like to a tire via an inboard connection subsystem 20 (FIG. 4) and an outboard connection subsystem 29 (FIG. 1). The system 10 ensures that the chains 2 are easily installed and remain safely in place adjacent the tire T of the wheel W throughout use of the chains 2.

Figures 4, 5:
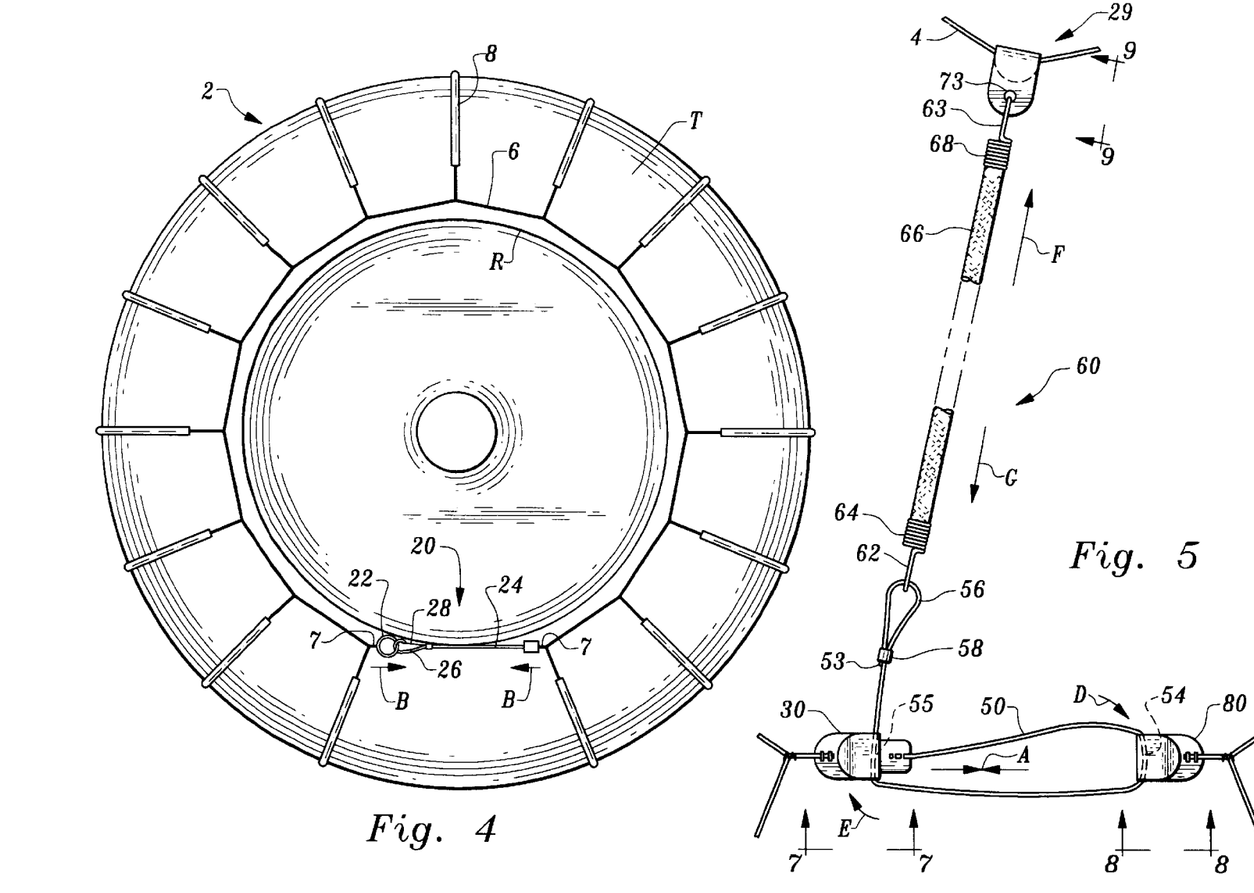
FIG. 4 is a side elevation view from an inboard perspective of a wheel assembly with the tire traction enhancement system of this invention installed on the wheel and depicting the inboard connection subsystem of this invention.
FIG. 5 is a detail of a portion of that which is shown in FIG. 1 depicting the outboard connection subsystem of this invention in its installed mode. This view shows the cable routing through the grooves in the cable guides and hooked to the outboard circumferential elongate element.

In essence, and with particular reference to FIGS. 1–5, the basic details of the system 10 are described. The attachment system 10 includes an inboard connection subsystem 20 (FIG. 4) and an outboard connection sub-system 29 (FIGS. 1 and 5). These two subsystems 20, 29 are utilized to draw the ends 5, 7 (FIG. 3) of the circumferential elements 4, 6 of the chains 2 tightly together. The inboard connection subsystem 20 includes a means to releasably connect the ends 7 of the inboard circumferential element 6 together while the chains 2 are draped over the tire T of the wheel W.

As most clearly shown in FIG. 5, the outboard connection subsystem 29 includes a means to releasably attach the ends 5 of the outboard circumferential elements 4 together and also provides for tensioning to ensure that the chains 2 are tightly held over the tire T of the wheel W. The outboard connection subsystem 29 includes a first cable guide 30 attached to a first end 5 and a second cable guide 80 attached to a second end 5 of the outboard circumferential element 4. Each cable guide 30, 80 has a bearing surface 40, 87 configured to slidably support a cable 50. The cable 50 is attached to the first end 5 of the outboard circumferential element 4. The cable 50 is routed about the bearing surface 87 of the second cable guide 80 and then about the bearing surface 40 of the first cable guide 30 before the cable 50 is extended across a hub H of the wheel W and is attached to a mid-portion of the outboard circumferential element 4 between the ends 5.

A resilient tensioner 60 is interposed on the cable 50 which can be stretched until a hook 70 on a free end 63 of the tensioner 60 can reach the mid-portion of the outboard circumferential element 4 by crossing the center hub H of the wheel W. Because the cable 50 is routed over both the first cable guide 30 and the second cable guide 80, a mechanical advantage similar to that provided by a block and tackle pulley system is provided. Consequently, a closure force (along arrow A of FIG. 1) greater than the amount of tension force (arrow C of FIG. 1) in the cable 50 is provided to close the ends 5, 7 of the circumferential elements 4, 6 of the chains 2 about the tire T of the wheel W.

Tire traction enhancement systems such as the system 10 of this invention are frequently used to safely drive on freezing, wet, snowy and icy roadways. Many municipalities apply corrosive chemicals and salt to these roadways to melt the ice and to improve the safety of driving conditions. Consequently, the system 10 and chains 2 should be made of materials that have sufficient corrosion-resistance to extend useful life and avoid premature failure during operation.

More specifically, and with reference to FIGS. 1 through 4, details of the chains 2 used with the system 10 are described. The chains 2 of the present invention (FIG. 3) are comprised of two flexible circumferential elongate elements 4, 6 including an outboard circumferential elongate element 4 with a first and second end 5 and an inboard circumferential elongate element 6 with two ends 7. Transverse traction members 8 are connected between the two elongate elements 4, 6 to form a ladder-like configuration when laid out flat on the ground. The elongate elements may be made from chain, cable, woven hydrocarbon polymer straps or other like material, so long as they preferably exhibit flexibility and are substantially inelastic.

With reference to FIG. 4, details of the inboard connection subsystem are described. The two ends 7 of the inboard circumferential elongate element 6 are attached by the inboard connection subsystem 20 (FIG. 4). The inboard connection subsystem 20 includes means to releasably connect the two ends 7 of the inboard circumferential elongate element 6, to form a completed circle which lays on the inboard side of the tire T. The circle's circumference is greater than the circumference of the rim R of the wheel W, but less than the circumference of the tire T.

The means to attach the ends 7 of the inboard circumferential element 6 together preferably includes a rigid ring 22 or other similar connector which is attached to one end 7 of the inboard element 6. A short flexible strap 24 is attached to the other end 7 of the inboard element 6. The strap 24 may be an extension of the inboard circumferential elongate element 6 or a separate component made of different but equally strong material, such as braided nylon, braided Kevlar, rope or other like material. A small rigid clip 26, in the shape of a hook and including a flexible safety toggle 28, is attached to the free end of the strap 24. During installation, the clip 26 is connected to ring 22 to form the inboard element 6 into a complete and continuous circle.

The clip 26 must be large enough to hook to and safely retain the ring 22, but small enough to be easily manipulated and fit within the grasp of the individual reaching behind the tire T to hook the clip 26 to ring 22. An individual installer must be able to easily, quickly, safely and confidently hook the clip 26 to the ring 22 during adverse conditions which would likely include laying on cold, wet ground covered by snow on the shoulder of a busy thoroughfare. An installer may be ill-prepared to work in such adverse roadside conditions, therefore, ease and simplicity of installation is critical. An installer may have inadequate clothing to remain warm, may not have gloves which would prevent his or her hands from becoming numb from the cold, and may have difficulty grasping and retaining items due to wetness, all of which contribute to increasing the discomfort and difficulty associated with installation of a system. Hence, configuring the safety toggle 28 on an inside of the hook will allow the user to easily flex the toggle 28 inward and "snap" the ring 22 past the toggle 28 and into the clip 26.

The clip 26 and ring 22 are lightweight to prevent centrifugal force created by the rotation of the wheel W during vehicle operation from tossing the assembly about, thereby creating a risk of damage to the vehicle's fender well, the tire T, or the inboard connection subsystem 20. Further, the clip 26 and ring 22 are lightweight to prevent that same centrifugal force from creating a condition which would inadvertently disengage the clip 26 from the ring 22.

The flexible safety toggle 28 has sufficient flexibility to allow one with little strength to press the toggle 28 in against the back of the clip 26 especially for ease in removing the ring 22 from the clip 26. However, the toggle 28 is made of material with sufficient strength to withstand deformation caused by centrifugal force produced during vehicle operation which pushes the clip 28 outward from the hub H of the tire T, causing the ring 22 to impinge against the midpoint of the toggle 28. To engage the clip 26 onto the ring 22, the flexible toggle 28 is pressed against the back of the clip 26, either by a user or by being pressed against the ring 22 itself, a distance greater than the thickness of the ring 22 to provide sufficient clearance for the ring 22 to pass through the gap created between the hook end of the clip 26 and the end of the toggle 28.

The clip 26, strap 24 and ring 22 are made of material whose strength is sufficient to withstand tensile force B imposed during operation of the system 10 on a vehicle. The clip 26, strap 24 and ring 22 are preferably made of material with a low heat transfer coefficient, such as high impact plastic, which will be less of a heat sink than a metal material, therefore less apt to numb one's hands and consequently, allow one to more easily handle and manipulate the inboard connection subsystem in cold conditions for a longer duration. The clip 26, ring 22 and particularly, the toggle 28, should be made of corrosion-resistant material to avoid premature failure resulting from corrosion caused by exposure to salt or other chemicals placed on the roadways. Again, high-impact plastic or other similar elastomer is typically preferable to a metal such as stainless steel, due to its lightweight and preferable handling attributes in cold weather.

Figure 6:
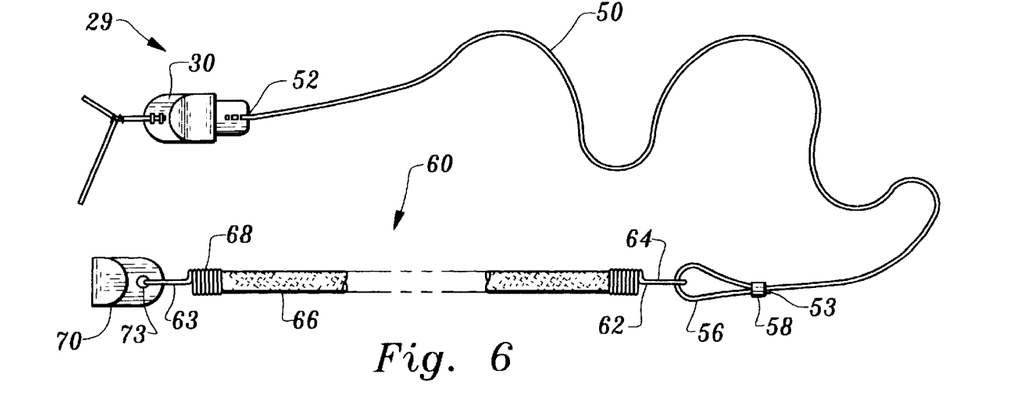
FIG. 6 is a top plan view of the outboard connection subsystem of this invention, in an uninstalled mode.
Figure 7:
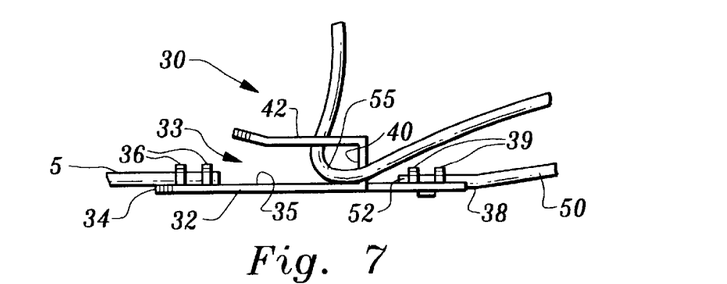
FIG. 7 is a side view taken along line 7—7 of FIG. 5 of the first cable guide of the outboard connection subsystem of this invention.

With reference to FIGS. 4–9, details of the outboard connection subsystem 29 are described. The outboard circumferential element 4 has a first cable guide 30 attached to a first end 5 (FIGS. 5 and 6). The first cable guide 30 includes a base 32 (FIG. 6), a bearing surface 40 and a guard 42. In an installed mode (FIGS. 1 and 5), the base 32 of the first cable guide 30 lays flat against the tire T. The bearing surface 40 extends perpendicularly from the outboard facing surface 35 of the base 32. The guard 42 extends perpendicularly from the bearing surface 40 and parallel to the base 32. Together, the base 32, the bearing surface 40 and the guard 42 form the shape of a hook with a groove 33 which can accept, guide and retain a cable 50. At a tip 42, the guard 44 is bent slightly away from the base 32 to provide a wider mouth to allow one to more easily engage the cable 50 within the groove 33. The bearing surface 40 is smooth with sufficient hardness to allow the cable 50 to both easily slide against the bearing surface 40 of the cable guide 30, yet withstand wear caused by the sliding movement of the cable 50 on the bearing surface 40 while subjected to loads caused by the closure force A (FIG. 5).

As a safety measure to prevent unexpected failure of the cable 50, the bearing surface 40 hardness should be less than that of the cable 50 material to ensure any wear first occurs on the bearing surface 40. In addition, the bearing surface 40 should be sufficiently corrosion-resistant to prevent pitting and roughening which could increase sliding frictional forces between the bearing surface 40 and the cable 50, potentially abrading the cable 50 and causing premature failure. One skilled in the art would recognize that the bearing surface 40 may be constructed to include a curved surface to further reduce sliding frictional forces. Additionally, such a curved surface may be contained within the boundaries of cable guide 30, 80 as shown, or may extend past the edges to include wings which would provide a longer curved surface with a larger radius of curvature. As an alternative, the bearing surface 40, which is fixed for simplicity, could be replaced with a pulley or other similar device which is rotationally mounted on either cable guide 30, 80 to substantially eliminate any wear on the cable 50 by eliminating any sliding frictional forces.

The first cable guide 30 is connected to one end 5 of the outboard circumferential elongate element 4 by attachment clamps 36 which are located on a curved end 34 of the base 32. To minimize point loading on the tire T and potential tire T sidewall wear, the clamps 36 are located on the outboard facing surface 35 of the base 32. The first cable guide 30 is connected to a first attached end 52 of the cable 50 by support clamps 39 located on a cable support end 38 of the base 32 opposite the curved end 34.

The cable 50 includes a first attached end 52 and a second opposite end 53 (FIGS. 5 and 6). The attached end 52 is connected to the first cable guide 30. The opposite end 53 forms a loop 56 which is secured by a closure 58. The loop 56 is connected to a tensioner 60. The cable 50 can be made of braided wire, nylon, Kevlar or other like material with sufficient tensile strength to withstand closure force A without substantially stretching or deforming and while retaining sufficient flexibility to be routed about the cable guides 30, 80.

The cable 50, in an installed mode, has a first curve 54 and a second curve 55 (FIG. 5). The first curve 54 is formed by routing the cable 50 (along arrow D of FIG. 5) first on the side of the second cable guide 80 described below (FIG. 7), closest to the hub H of the wheel W then through a groove 83 in the second cable guide 80 to the side of the second cable guide 80 furthest from the hub H of the wheel W, thereby bending the cable 50 at least about 180° about the second cable guide 80. The second curve 55 is then formed by routing the cable 50 (along arrow E of FIG. 5) on the side of the first cable guide 30 furthest from the hub H of the wheel W and through a groove 33 in the first cable guide 30 (FIG. 6), thereby bending the cable 50 at least about 90° about said first cable guide 80, toward the opposite side of the hub H of the wheel W.

Figure 8:
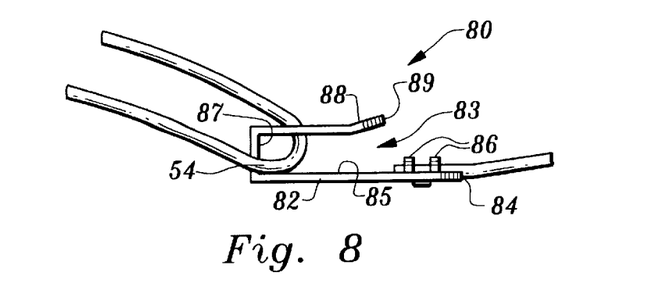
FIG. 8 is a side view taken along line 8—8 of FIG. 5 of the second cable guide of the outboard connection subsystem of this invention.

The second cable guide 80 includes a base 82, a bearing surface 87 and a guard 88, which together form a U-shape when viewed from the side (FIG. 8). The second cable guide 80 is attached to an end 5 of the outboard circumferential elongate element 4 by attachment clamps 86. The attachment clamps 86 are located on a curved end 84 of the base 82. The bearing surface 87 extends perpendicularly from an outboard facing surface 85 of the base 82 at the end opposite the curved end 84. The guard 88 extends perpendicularly from the bearing surface, completing the U-shape and providing a groove 83. The groove 83 captures and guides the cable 50. The guard 88 ends in a curved tip 89 which facilitates wrapping and unwrapping the cable 50 from around the second cable guide 80 during system 10 installation or removal, respectively. At its tip 89, the guard 88 is bent slightly away from the base 82 to provide a wider mouth to allow one to more easily engage the cable 50 within the groove 83. The bearing surface 87 preferably is configured similarly to the bearing surface 40 of the first cable guide 30.

As best shown in FIGS. 5 and 6, the tensioner 60 includes a cable end 62, a cable ring 64, an elastic cord 66, a hook ring 68 and a free end 63. The cable 50 is attached to the cable end 62 of the tensioner 60 through the cable ring 64. The tensioner 60 is made of material that can withstand forces created by the maximum tensile force ( along arrow C of FIG. 1). The elastic cord 66 is typically made of vulcanized rubber or other elastomer that retains its elasticity and resiliency in a broad range of operating conditions, particularly where temperatures drop below 32° F., the freezing temperature of water. In addition, the elastic cord 66 should be sufficiently resistant to exposure to corrosives such as oil, gasoline, salt and other road chemicals to retain its elasticity and resiliency. The tensioner 60 can be either considered as separate from but attached to the cable 50 or as forming a portion of the cable 50.

Figure 9:
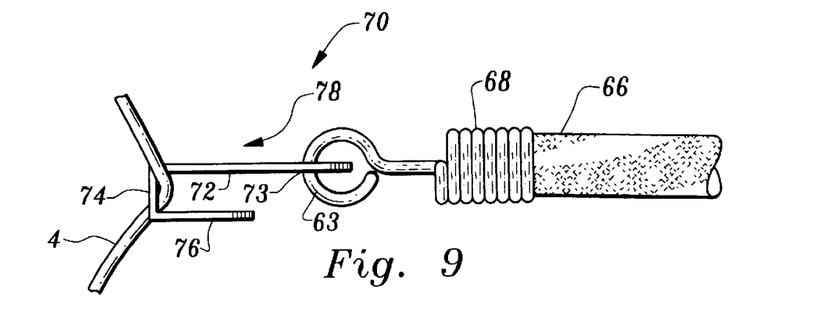
FIG. 9 is a side view taken along line 9—9 of FIG. 5 of the hook end of the outboard connection subsystem of this invention.

A rigid hook 70 is attached to the free end 63 of the tensioner 60 by means of the hook ring 68. The hook 70 includes a first plate 72, a second plate 74 and a third plate 76, which together form a U-shape to create a slot 78. A hole 73 is located at one end of the first plate 72. The hook ring 68 passes through this hole 73, connecting the elastic cord 66 of the tensioner 60 to the hook 70 and connecting the cable 50 to the hook 70. The second plate 74 extends perpendicularly from the opposite end of the first plate 72. The third plate 76 extends perpendicularly from the second plate 74 toward the hole 73. Together, these plates 72, 74, 76 form the U-shaped hook 70 to provide a slot 78. The slot 78 receives and retains the outboard circumferential elongate element 4 of the chains 2 at its approximate midpoint (FIGS. 1, 5 and 9). The slot 78 has a width greater that that of the diameter of the outboard element 4. Alternatively, the hook 70 could be constructed to include two fingers such that each finger would engage the outboard element 4 on opposite sides of the point of connection between a transverse traction member 8 and the outboard element 4.

In use and operation, and with particular reference to FIGS. 1 through 9, the methods by which the attachment system 10 connects, holds and retains the chains 2 to the tire T are described. At installation, the chains 2 are first draped over the tire T. The tire T does not need to be jacked off the ground for installation. Further, the vehicle does not need to be moved at any time during the installation process. The chains 2 are oriented such that the inboard circumferential elongate element 6 with inboard connection subsystem 20 is draped on the inboard side of the tire T, closest to the centerline of the vehicle. The outboard circumferential elongate element 4, with cable 50 and tensioner 60, is draped on the outboard side of the tire T. As a result, several transverse traction members 8 will lay across the tread I of the tire T.

Once the chains 2 are draped over the tire T, the installer first attaches the inboard connection subsystem 20. The installer reaches behind the tire T to connect the clip 26 to the ring 22. During this process, the safety toggle 28 of the clip 26 is depressed sufficiently to allow the ring 22 to pass over the hook end of the clip 26. Once released, the resilient safety toggle 28 fully closes against the hook end of the clip 26, thereby preventing inadvertent release of the clip 26 from the ring 22 during installation or operation of the system 10. After connecting the clip 26 to the ring 22, the installer adjusts the inboard circumferential elongate element such that it uniformly encircles the rim R of the wheel W.

After the inboard connection subsystem 20 is attached, without jacking the tire T off the ground, the installer assembles the outboard connection subsystem 29. First, the installer pulls the ends of the outboard circumferential elongate element 4 together to remove a majority of slack from the inboard circumferential elongate element 6. Then, the cable 50 is routed (along arrow D of FIG. 5) through the groove 83 of the second cable guide 80. While maintaining sufficient tension to keep the cable 50 in the groove 83 of the second cable guide 80, the cable 50 is then routed (along arrow E of FIG. 5) through the groove 33 of the first cable guide 30. Then, while maintaining sufficient tension to prevent the cable 50 from falling out of the groove 33 of the first cable guide 30, the hook 70 at an end of the cable 50 beyond the tensioner 60 in the cable 50 is pulled and stretched in a direction (arrow F of FIG. 5) across the hub H of the wheel W toward the diametrically-opposed side of the circle formed by the outboard circumferential elongate element 4.

In pulling the hook 70 toward the diametrically-opposed side of the outboard circumferential elongate element 4 (arrow F of FIG. 5), slack is removed from the cable 50 which has been routed around both cable guides 30, 80. Once initial slack is removed from the cable 50, the elastic cord 66 of the tensioner 60 is stretched in a direction (arrow F of FIG. 5) toward the diametrically opposed side of the outboard circumferential elongate element 4 to create a tensile force C (arrow C of FIG. 1)in the elastic cord 66. The hook 70 is then releasably attached to the midpoint of the outboard circumferential elongate element 4 between the connection points of the two nearest transverse traction members 8 so that the tensioner 60 is aligned over the hub H.

The tensile force C created in the elastic cord 66 is imparted to the cable 50. The tensile force C imparts a line pull around both cable guides 30, 80 which creates an outside closure force A (arrow A of FIG. 1) which is approximately twice the magnitude of tensile force C. The closure force A draws the ends 5 of the outboard circumferential elongate element 4 closer together. As the ends 5 of the outboard circumferential elongate element 4 are drawn closer together, additional slack is removed from both the inboard circumferential elongate element 6 and its associated inboard connection subsystem 20.

To accommodate tires of varying sizes, the length and elasticity of the elastic cord 66 could be adjusted to vary closure force A. Also, one skilled in the art would recognize that the inboard connection subsystem 29 could be easily modified to include a means for adjustment to further accommodate tires of varying sizes. In addition, the length and elasticity of the elastic cord 66 could be adjusted to vary the amount of slack which can be removed from the cable 50 and the entire attachment system 10. After initial installation, the tensioner 60 will continue to remove any slack in the system 10 which may develop during operation of the vehicle.

Eventually, all slack is removed from the inboard element 6 and the inboard connection subsystem 20. At this point, the inboard element 6 and the inboard connection subsystem 20 form a circle whose circumference equals the combined lengths of the inboard element 6 and the inboard connection subsystem 20. Then, the inboard element 6 and connection subsystem 20 begins to be subjected to an inside closure force B (arrow B of FIG. 3) created by the transfer of force from the tensioner 60 to the outboard element 4 and through the transverse traction members 8.

Once the inboard element 6 reaches its maximum diameter, the tensioner 60 will continue to generate the outside closure force A. This continual closure force A will continue to draw the ends 5 of the outboard element 4 closer together, removing any residual slack within the system 10. As the ends 5 of the outboard element 4 draw closer together and slack is removed, the transverse traction members 8 are drawn more tightly against the tread I of the tire T, remaining substantially centered and uniformly distributed on the wheel assembly W. This self-centering action serves to uniformly balance the system 10 and chains 2 about the tire T, thereby improving the smoothness of the vehicle's ride by reducing the vibration at higher vehicle speeds.

After initial installation of the system 10 and chains 2 on the vehicle's tire T, the vehicle should be driven slowly forward to allow the tensioner 60 to remove initial substantial slack left in the system 10 and chains 2. The vehicle may then be driven at normal safe operating speeds.

During operation of a vehicle with the system 10 installed, the system 10 will tend to loosen as its components are stretched and heated by forces and friction created as the tire T rolls on the road surface. As incremental slack develops, it will be continually removed from the system 10 by the tensioner 60. Hence, unlike other previous systems, once the present invention is installed, the vehicle need not be stopped to periodically retighten the attachment system 10.

The present invention provides distinct benefit to those with little strength who find themselves forced to install chains in adverse conditions. First, the tensile force C, which is created by stretching the elastic cord 66, is amplified by the mechanical advantage created by the cable 50 and cable guide 30, 80 configuration. This configuration creates a closure force A which is approximately twice that of the tensile force C. One skilled in the art would recognize that this mechanical advantage can be enhanced by adding additional grooves 33, 83 to the cable guides 30, 80 and increasing the number of wraps of the cable 50 from one guide to the next.

The individual physical strength required for installation of the attachment system 10 and chains 2 can be further reduced by providing a means to connect multiple elastic cords 66 in parallel. The multiple elastic cords would typically begin and end at the same places as the elastic cord 66 described in the present invention. However, each individual elastic cord would require less strength to stretch across the hub H of the wheel W to hook to a point on the outboard circumferential elongate element 4. In this circumstance, a likely configuration could include a connector which is permanently affixed to the midpoint of the outboard circumferential elongate element 4. The connector could include multiple connection points to which individual elastic cords could be stretched to create individual tensile forces. The individual tensile forces would be additive and create a total tensile force C.

For example, if one wishes to reduce the required installation strength by half, one would connect two elastic cords in parallel. Each elastic cord 66 would require half the strength to stretch and connect to the midpoint of the outboard circumferential elongate element 4 and impart one-half of the tensile force C. One skilled in the art would recognize that this strength reduction advantage can be further extended by increasing the number of elastic cords hooked in parallel.

The present invention greatly simplifies removal of the attachment system 10. To remove the attachment system 10 and chains 2, the vehicle can be first rolled forward or backward so that the ends 5, 7 of both circumferential elongate elements 4, 6 are not sandwiched between the tread I of the tire T and the ground or pavement.

Then, the hook 70 is disconnected from the outboard element 4. The present invention provides an alternative removal procedure if one finds that the hook 70 is held firmly against the sidewall of the tire T by the tightness of the outboard circumferential elongate element 4. The frictional forces created by the force of the outboard circumferential elongate element 4 pressing the hook 70 against the rubber sidewall of the tire T could be sufficient to make it very difficult for individuals with lower levels of physical strength to slide the hook 70 from between the sidewall rubber and the chord of the outboard circumferential elongate element 4.

The tensioner 60 of the present invention solves this potential removal problem. Both cable guides 30, 80 have open grooves, 33, 83. Hence, the cable 50 may be easily slipped over the guard 44, 88 and off of either guide 30, 80 to introduce slack into the system 10. Hence, one need not attempt to release the hook 70 while the outboard circumferential elongate element 4 is pulled taught against the tire T by the outboard connection subsystem 29. If faced with this dilemma, removal of the system 10 can be accomplished by first stretching the elastic cord 66 by pulling its cable end 62 in a direction G (arrow G of FIG. 5) toward the first cable guide 30. This stretching introduces sufficient slack in the cable 50 to allow one to easily unwrap the cable 50 from around the first cable guide 30. Once the cable 50 has been unwrapped from the first cable guide 30, additional slack has been introduced into the cable 50 which may then be more easily unwrapped from around the second cable guide 80.

Once the cable 50 has been unwrapped from around both cable guides, 30, 80, substantial slack has been introduced into the cable 50 and hence, the ends 5 of the outboard elongate element 4 are somewhat free. As a consequence, the outboard elongate element 4 is slack and no longer pulled taught against the tire T. Then, the hook 70 may be easily released from its connection to the midpoint of the outboard elongate element 4.

The slack created in the outboard connection subsystem 29 by completely releasing the tensioner 60 provides sufficient slack in the inboard circumferential elongate element 6 to allow swift and easy disconnection of the inboard connection subsystem 20. To disconnect the ends 7 of the inboard element 6, the installer will reach behind the tire T to depress the safety toggle 28 to allow the ring 22 to be unhooked from the clip 26.

Once both the inboard and outboard connection subsystems 20, 29 have been released, the chains 2 and attachment system 10 can be pulled off the tire T to the ground.

This disclosure is provided to reveal a preferred embodiment of the invention and a best mode for practicing the invention. Having thus described the invention in this way, it should be apparent that various different modifications can be made to the preferred embodiment without departing from the scope and fair meaning of this disclosure.

What is claimed is:

1. A tire traction enhancement system, comprising in combination:
    at least two elongate flexible circumferential elements including an outboard circumferential element and an inboard circumferential element, each elongate circumferential element having two ends, said elongate circumferential elements oriented substantially parallel to each other;
    a plurality of elongate traction members, each traction member extending between and attached to both said outboard circumferential element and said inboard circumferential element;
    means to attach said ends of said inboard circumferential element together; and
    means to secure said ends of said outboard circumferential element together including:
        a first cable guide attached to a first one of said ends of said outboard circumferential element;
        a second cable guide attached to a second one of said ends of said outboard circumferential element;
        each said cable guide including a bearing surface;
        a flexible cable connected at a first end to said end of said outboard circumferential element which is attached to said first cable guide;
        said cable routed over said bearing surface of said first cable guide and over said bearing surface of said second cable guide; and
        said cable having a means to releasably attach to said outboard elongate circumferential element between said ends of said outboard circumferential element.

2. The system of claim 1 wherein said cable passes over said second cable guide first and said first cable guide second as said cable extends from said first end to said releasable attachment means.

3. The system of claim 2 wherein said bearing surfaces of said cable guides are configured to allow said cable to freely slide there over.

4. The system of claim 3 wherein said cable includes an elastic cord forming at least a portion of said cable, said elastic cord capable of being stretched, causing said releasable attachment means to be spaced a variable distance from said first end, said elastic cord exerting a force on said outboard circumferential element proportional to an amount said elastic cord is stretched.

5. The system of claim 4 wherein said releasable attachment means of said second end of said cable includes a hook thereon having a width greater than a width of said outboard circumferential element, such that said hook can engage said outboard circumferential element at a location between said ends of said outboard circumferential element.

6. The system of claim 5 wherein said cable bends at least about 180° about said second cable guide and bends at least about 90° about said first cable guide.

7. The system of claim 6 wherein each said bearing surface is oriented substantially perpendicular to a plane in which said outboard circumferential element is oriented with said bearing surface facing an end of said circumferential element to which said bearing surface is attached.

8. The system of claim 7 wherein a guard is oriented adjacent a side of said bearing surface outboard from a plane in which said outboard circumferential element is oriented, said guard extending from said bearing surface toward said end of said outboard circumferential element to which said bearing surface is attached, such that said guard assists in keeping said cable from moving in an outboard direction and falling off of said adjacent bearing surface.

9. The system of claim 8 wherein said circumferential elements are formed from cables which are substantially inelastic.

10. A system for attachment of a tire covering device such as tire chains, tire cables and the like in a position overlying a tire of a wheel, the traction enhancement device having an inboard elongate circumferential element with two ends and an outboard elongate circumferential element with two ends including a first end and a second end opposite the first end, said attachment system comprising in combination:
    a cable attached at an attached end to the first end of the outboard circumferential element;
    a first cable guide attached to the first end of the outboard circumferential element;
    a second cable guide attached to the second end of the outboard circumferential element; and
    said cable routed from said attached end, around said second cable guide, then around said first cable guide, and then to a mid-portion of the outboard circumferential element between the first end of the outboard circumferential element and the second end of the outboard circumferential element.

11. The attachment system of claim 10 wherein said system includes a means to releasably connect the two ends of the inboard circumferential element together.

12. The system of claim 10 wherein at least a portion of said cable is elastic where said cable extends between said first guide and the mid-portion of the outboard circumferential element.

13. The system of claim 10 wherein both said first cable guide and said second cable guide include means to slidably support said cable adjacent thereto.

14. The system of claim 10 wherein said cable wraps approximately 180° around said second cable guide and said cable wraps greater than 90° around said first cable guide.

15. The system of claim 14 wherein said cable wraps around said second cable guide in a direction causing said cable to first be closer to a hub of the wheel before wrapping around said second cable guide and then being further from the hub of the wheel after said cable wraps around said second cable guide; and wherein said cable is on a side of said first cable guide opposite the hub of the wheel before said cable wraps around said first cable guide and is closer to the hub of the wheel than said first cable guide after said cable wraps around said first cable guide.

16. The system of claim 10 wherein said attached end of said cable is attached to the first end of the outboard circumferential element through said first cable guide.

17. The system of claim 10 wherein both said first cable guide and said second cable guide include open grooves into which said cable can be placed, each said cable guide including means to resist inboard and outboard movement of said cable relative to each said cable guide.

18. A method for attaching a tire traction enhancement device such as tire chains, tire cables and the like in a position overlying a tire of a wheel, the tire traction enhancement device having an inboard elongate circumferential element with two ends, an outboard elongate circumferential element with two ends and a plurality of transverse members extending between the inboard circumferential element and the outboard circumferential element, the method including the steps of:

providing an inboard circumferential element connection means;

providing an outboard circumferential element connection system including a cable attached at an attachment end to a first one of the ends of the outboard circumferential element, a first cable guide attached to the first end of the outboard circumferential element, and a second cable guide attached to a second one of said ends of the outboard circumferential element, the second end opposite the first end;

draping the tire traction enhancement device over the tire with the inboard circumferential element on an inboard side of the wheel and the outboard circumferential element on an outboard side of the wheel;

connecting the ends of the inboard circumferential element together with the inboard circumferential element connection means;

routing the cable from the attached end, about the second cable guide and then about the first cable guide; and securing a portion of the cable extending beyond the first cable guide to a mid-portion of the outboard circumferential element between the first end of the outboard circumferential element and the second end of the outboard circumferential element.

19. The method of claim 18 including the further steps of:

interposing an elastic cord between the attached end of the cable and a free end of the cable opposite the attached end; and applying tension force to the free end of the cable and stretching the elastic cord of the cable such that the cable draws the first cable guide toward the second cable guide and the first end of the outboard circumferential element toward the second end of the outboard circumferential element.

20. The method of claim 19 wherein said routing step includes the steps of:

wrapping the cable at least 180° about the second cable guide;

wrapping the cable at least 90° about the first cable guide such that the first cable guide is drawn toward the second cable guide by a greater amount of force than an amount of force applied in tension to the cable during said tensioning applying step; and orienting the elastic cord to be over a center of a hub of the wheel.

* * * * *